US011958727B2

(12) United States Patent
Costa

(10) Patent No.: US 11,958,727 B2
(45) Date of Patent: Apr. 16, 2024

(54) SNATCH RING PULLEY

(71) Applicant: Warn Industries, Inc., Clackamas, OR (US)

(72) Inventor: Michael Douglas Costa, Boise, ID (US)

(73) Assignee: WARN INDUSTRIES, INC., Clackamas, OR (US)

( * ) Notice: Subject to any disclaimer, the term of this patent is extended or adjusted under 35 U.S.C. 154(b) by 667 days.

(21) Appl. No.: 17/066,723

(22) Filed: Oct. 9, 2020

(65) Prior Publication Data

US 2021/0130142 A1 May 6, 2021

Related U.S. Application Data

(60) Provisional application No. 62/928,013, filed on Oct. 30, 2019.

(51) Int. Cl.
*B66D 1/36* (2006.01)

(52) U.S. Cl.
CPC .......... *B66D 1/36* (2013.01); *B66D 2700/026* (2013.01)

(58) Field of Classification Search
CPC ... B66D 1/74; B66D 1/36; B66D 1/30; B66D 3/04; B66D 3/26; B66D 2700/026; F16H 55/50
USPC .......................................................... 254/408
See application file for complete search history.

(56) References Cited

U.S. PATENT DOCUMENTS 3,375,725 A * 4/1968 Mathison ................ F16H 55/38 474/164
3,719,099 A * 3/1973 Eastcott .................. F16H 55/50 474/196
3,934,482 A * 1/1976 Byers ................... B66D 1/7405 474/178
4,230,306 A * 10/1980 Porter .................. B66D 1/7494 254/371
5,238,227 A * 8/1993 White .................. B66D 1/7415 474/96
5,722,640 A * 3/1998 Skyba ..................... F16H 55/38 254/371
7,137,481 B2 * 11/2006 Petzl ........................ A62B 1/10 188/65.1
7,673,851 B2 * 3/2010 Lange .................. F16C 19/381 254/416

(Continued)

OTHER PUBLICATIONS

European Search Report for related European Application No. 20201044.3; action dated Mar. 18, 2021; (8 pages).

(Continued)

*Primary Examiner* — Michael R Mansen
*Assistant Examiner* — Henrix Soto
(74) *Attorney, Agent, or Firm* — K&L Gates LLP

(57) ABSTRACT

One illustrative embodiment of the present disclosure may include a snatch ring pulley assembly including a pulley wheel body and a deformable retention feature affixed to the pulley wheel body. The pulley wheel body includes a rope saddle portion, a first outer wheel portion, and a second outer wheel portion substantially parallel to the first outer wheel portion. The deformable retention feature is affixed to the first outer wheel portion and extends toward the second outer wheel portion. The deformable retention feature extends uniformly around a circumference of the first outer wheel portion and extends substantially perpendicular to the first outer wheel portion.

11 Claims, 12 Drawing Sheets

(56) References Cited

U.S. PATENT DOCUMENTS

| | | | | |
|---|---|---|---|---|
| 9,975,743 | B2 * | 5/2018 | Barnet | B66D 1/36 |
| 10,023,445 | B2 * | 7/2018 | Boulliat | B66D 1/7489 |
| 10,161,488 | B1 * | 12/2018 | Meyer | F16H 55/36 |
| 2016/0367840 | A1 * | 12/2016 | Resch | A62B 1/08 |
| 2018/0244504 | A1 * | 8/2018 | McCarthy | F16H 55/36 |
| 2018/0346302 | A1 * | 12/2018 | Bullock | B66D 3/04 |

OTHER PUBLICATIONS

Extended European Search Report for related European Application No. 20201044.3; action dated Nov. 7, 2022; (5 pages).

* cited by examiner

SNATCH RING PULLEY

PRIORITY CLAIM AND CROSS REFERENCE TO RELATED APPLICATIONS

The present application claims priority to and the benefit of U.S. Provisional Patent Application No. 62/928,013, entitled "Snatch Ring Pulley," filed on Oct. 30, 2019, the entire contents of which are hereby incorporated by reference and relied upon.

TECHNICAL FIELD

The present disclosure relates generally to a snatch ring pulley assembly for use with a powered winch. For example, a snatch ring pulley assembly may be used in horizontal winching of vehicles.

BACKGROUND

Stuck vehicles, such as vehicles driving in off-road conditions, are often moved using powered winches. Adding snatch rings to a winching assembly can increase the load capacity of a powered winch, making it less difficult to move the vehicle. Traditional snatch rings rely on tension in the rope running through the snatch ring to keep the rope in a rope saddle of the snatch ring. In vertical rigging applications, gravity effectively keeps tension in the rope. When a snatch ring is used in a horizontal rigging application, slack may be introduced into the system, causing the rope to dislodge from the rope saddle. Improved snatch rings, and related pulleys, are therefore needed.

The information included in this Background section of the specification, including any references cited herein and any description or discussion thereof, is included for technical reference purposes only and is not to be regarded subject matter by which the scope of the invention is to be bound.

SUMMARY

One illustrative embodiment of the present disclosure may include a snatch ring pulley assembly with a pulley wheel body and a deformable retention feature. The pulley wheel body may include a first outer wheel portion and a second outer wheel portion substantially parallel to the first outer wheel portion. The pulley wheel body may further define a rope saddle portion between the first outer wheel portion and the second outer wheel portion, and a center aperture extending through the first outer wheel portion and the second outer wheel portion. The deformable retention feature may be affixed to the first outer wheel portion of the pulley wheel body. The deformable retention feature may extend toward the second outer wheel portion, uniformly around and adjacent to an outer circumference of the first outer wheel portion, and between and substantially perpendicular to both the first outer wheel portion and the second outer wheel portion.

Another illustrative embodiment of the present disclosure may include a snatch ring pulley assembly including a pulley wheel body and a plurality of flexible fingers. The pulley wheel body may include a first outer wheel portion including a plurality of through holes defined therein and a second outer wheel portion substantially parallel to the first outer wheel portion and including a plurality of through holes defined therein. A rope saddle portion may be defined in the pulley wheel body between the first outer wheel portion and the second outer wheel portion. A first plurality of resilient fingers may be seated within the plurality of through holes in the first outer wheel portion. A second plurality of resilient fingers may be seated within the plurality of through holes in the second outer wheel portion. The first plurality of resilient fingers may extend from the first outer wheel portion toward the second outer wheel portion. The second plurality of resilient fingers may extend from the second outer wheel portion toward the first outer wheel portion.

Another illustrative embodiment of the present disclosure may include a snatch ring pulley assembly including a pulley wheel body and first and second annular protrusions. The pulley wheel body may include a first outer wheel portion including a plurality of through holes defined therein and a second outer wheel portion substantially parallel to the first outer wheel portion and including a plurality of through holes defined therein. A rope saddle portion may be defined on the pulley wheel body between the first outer wheel portion and the second outer wheel portion. The first continuous annular protrusion may be positioned adjacent to an outer circumference of the first outer wheel portion and extend substantially perpendicular to the first outer wheel portion. The second continuous annular protrusion may be positioned adjacent to an outer circumference of the second outer wheel portion and extend substantially perpendicular to the second outer wheel portion.

In light of the disclosure herein, and without limiting the scope of the invention in any way, in a first aspect of the present disclosure, which may be combined with any other aspect listed herein unless specified otherwise, a snatch ring pulley assembly includes a pulley wheel body and a first deformable retention feature. The pulley wheel body includes a first outer wheel portion, a second outer wheel portion substantially parallel to the first outer wheel portion, and a rope saddle portion. The rope saddle portion is defined between the first outer wheel portion and the second outer wheel portion, and defines a center aperture extending through the first outer wheel portion and the second outer wheel portion. The first deformable retention feature is affixed to the first outer wheel portion of the pulley wheel body. The first deformable retention feature extends toward the second outer wheel portion, uniformly around and adjacent to an outer circumference of the first outer wheel portion, and between and substantially perpendicular to both the first outer wheel portion and the second outer wheel portion.

In a second aspect of the present disclosure, which may be combined with any other aspect listed herein unless specified otherwise, the snatch ring pulley further includes a second deformable retention feature affixed to the second outer wheel portion. The second deformable retention feature extends toward the first outer wheel portion, uniformly around and adjacent to an outer circumference of the second outer wheel portion, and between and substantially perpendicular to both the first outer wheel portion and the second outer wheel portion.

In a third aspect of the present disclosure, which may be combined with any other aspect listed herein unless specified otherwise, the first deformable retention feature comprises a plurality of resilient fingers spaced apart from each other.

In a fourth aspect of the present disclosure, which may be combined with any other aspect listed herein unless specified otherwise, the first deformable retention feature and the second deformable retention feature both comprise respective pluralities of resilient fingers spaced apart from each other.

In a fifth aspect of the present disclosure, which may be combined with any other aspect listed herein unless specified otherwise, each of the resilient fingers of the first deformable retention feature are aligned with respective opposing resilient fingers of the second deformable retention feature.

In a sixth aspect of the present disclosure, which may be combined with any other aspect listed herein unless specified otherwise, the pulley wheel body defines a plurality of through holes in the first outer wheel portion and a plurality of through holes in the second outer wheel portion. The resilient fingers of the first deformable retention feature seat within the through holes in the first outer wheel portion. The resilient fingers of the second deformable retention feature seat within the through holes in the second outer wheel portion.

In a seventh aspect of the present disclosure, which may be combined with any other aspect listed herein unless specified otherwise, the first deformable retention feature is in the form of a continuous annular protrusion extending substantially perpendicular to the first outer wheel portion.

In an eighth aspect of the present disclosure, which may be combined with any other aspect listed herein unless specified otherwise, the first deformable retention feature is in the form of a continuous annular protrusion extending substantially perpendicular to the first outer wheel portion. The second deformable retention feature is in the form of a continuous annular protrusion extending substantially perpendicular to the second outer wheel portion.

In a ninth aspect of the present disclosure, which may be combined with any other aspect listed herein unless specified otherwise, the continuous annular protrusion comprises a flat coupling surface affixed to the first outer wheel portion of the pulley wheel body.

In a tenth aspect of the present disclosure, which may be combined with any other aspect listed herein unless specified otherwise, the pulley wheel body defines an annular groove in the first outer wheel portion. The continuous annular protrusion comprises a coupling feature that forms a base of the continuous annular protrusion and is configured to be retained within the annular groove. The coupling feature of the continuous annular protrusion is retained in the annular groove.

In an eleventh aspect of the present disclosure, which may be combined with any other aspect listed herein unless specified otherwise, the annular protrusion comprises a rib with a triangular cross-section.

In a twelfth aspect of the present disclosure, which may be combined with any other aspect listed herein unless specified otherwise, the annular protrusion comprises a thin annular wall.

In a thirteenth aspect of the present disclosure, which may be combined with any other aspect listed herein unless specified otherwise, the deformable retention feature is in the form of a bristle ring including a plurality of flexible bristles extending from a base ring.

In a fourteenth aspect of the present disclosure, which may be combined with any other aspect listed herein unless specified otherwise, the pulley wheel body defines an annular groove in the first outer wheel portion. The base ring comprises a coupling feature that is configured to be retained within the annular groove. The coupling feature of the bristle ring is retained in the annular groove.

In a fifteenth aspect of the present disclosure, which may be combined with any other aspect listed herein unless specified otherwise, a surface defining the center aperture is coated with a material having a low coefficient of friction.

In a sixteenth aspect of the present disclosure, which may be combined with any other aspect listed herein unless specified otherwise, a snatch ring pulley includes a pulley wheel body and a first plurality of resilient fingers. The pulley wheel body includes a first outer wheel portion including a plurality of through holes defined therein, a second outer wheel portion substantially parallel to the first outer wheel portion and including a plurality of through holes defined therein, and a rope saddle portion defined between the first outer wheel portion and the second outer wheel portion. The first plurality of resilient fingers is seated within the plurality of through holes in the first outer wheel portion and a second plurality of resilient fingers is seated within the plurality of through holes in the second outer wheel portion. The first plurality of resilient fingers extend from the first outer wheel portion toward the second outer wheel portion. The second plurality of resilient fingers extend from the second outer wheel portion toward the first outer wheel portion.

In a seventeenth aspect of the present disclosure, which may be combined with any other aspect listed herein unless specified otherwise, the rope saddle portion of the pulley wheel body defines a plurality of rope traction features.

In an eighteenth aspect of the present disclosure, which may be combined with any other aspect listed herein unless specified otherwise, the pulley wheel body defines a center aperture bounded by a surface and the surface is coated with a material having a low coefficient of friction.

In a nineteenth aspect of the present disclosure, which may be combined with any other aspect listed herein unless specified otherwise, a snatch ring pulley assembly includes a pulley wheel body, a first continuous annular protrusion, and a second continuous annular protrusion. The pulley wheel body includes a first outer wheel portion including a plurality of through holes defined therein, a second outer wheel portion substantially parallel to the first outer wheel portion and including a plurality of through holes defined therein, and a rope saddle portion defined between the first outer wheel portion and the second outer wheel portion. The first continuous annular protrusion is adjacent to an outer circumference of the first outer wheel portion and extends substantially perpendicular to the first outer wheel portion. The second continuous annular protrusion is adjacent to an outer circumference of the second outer wheel portion and extends substantially perpendicular to the second outer wheel portion.

In a twentieth aspect of the present disclosure, which may be combined with any other aspect listed herein unless specified otherwise, the pulley wheel body defines respective annular grooves in each of the first outer wheel portion and the second outer wheel portion. Each of the first and second continuous annular protrusions comprises a coupling feature that forms a base of the respective continuous annular protrusion and is configured to be retained within the respective annular grooves. The coupling features of the respective continuous annular protrusions are retained in the respective annular grooves.

Additional features and advantages of the disclosed devices, systems, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been selected for readability and instructional purposes, and not to limit the scope of the inventive subject matter.

BRIEF DESCRIPTION OF THE DRAWINGS

Understanding that figures depict only typical embodiments of the invention and are not to be considered to be limiting the scope of the present disclosure, the present disclosure is described and explained with additional specificity and detail through the use of the accompanying figures. The figures are listed below.

DETAILED DESCRIPTION

Figure 1:
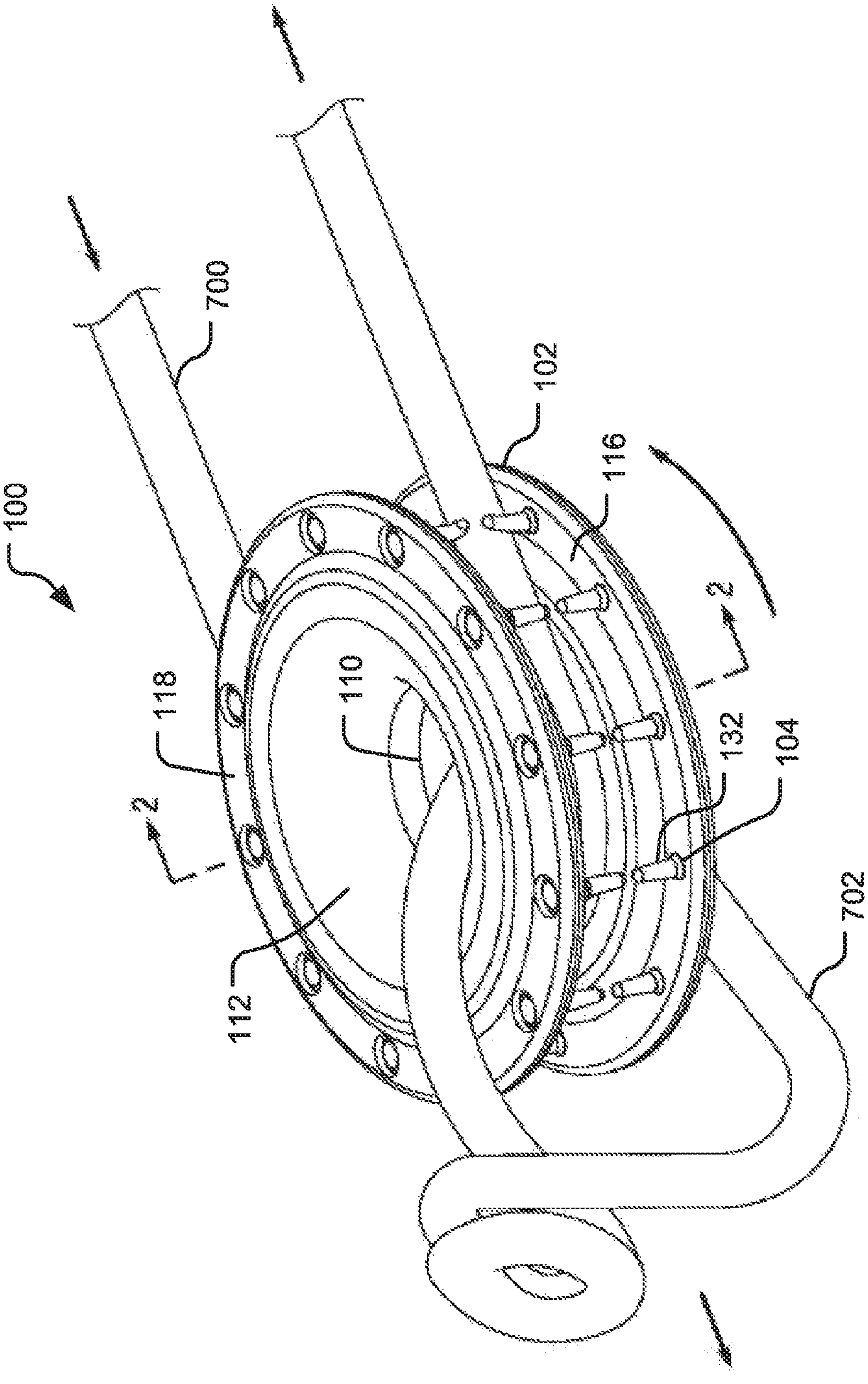
FIG. 1 is an isometric view of an implementation of a snatch ring pulley assembly.

Snatch ring pulleys are often used in conjunction with powered winches to move large vehicles. When used in horizontal rigging applications, slack is often introduced into the system, which, in turn, can cause the rope to dislodge from a rope saddle of the snatch ring pulley. Accordingly, the snatch ring pulley of the instant disclosure includes a flexible retention feature. In some implementations, the snatch ring pulley also includes a traction feature. The flexible retention feature guides the rope towards the rope saddle when slack is introduced into the system to keep the rope from dislodging from the snatch ring pulley. Because the retention feature is flexible, the retention feature may extend around the perimeter of the snatch ring pulley and deform at the entry and exit points of the rope. Accordingly, the snatch ring pulley can be used at multiple rope angles without causing damage to the surface of the rope.

Snatch Ring Pulley with Flexible Fingers Retention Feature—Components

Exemplary implementations of the snatch ring pulley assembly 100 may generally be composed of a pulley wheel body 102 and at least one rope retention feature 104. In some implementations, the pulley wheel body 102 may include a traction feature 114. The pulley wheel body 102 is generally toroidal in shape. Two disc-shaped outer wheel portions 108*a/b* are connected by a rope saddle portion 106. Though the pulley wheel body 102 is described in terms of the three portions, the pulley wheel body 102 may be formed from one piece of material as a unitary body. The pulley wheel body 102 may be formed from, for example, aluminum, titanium, a polymer, a ferrous material, or a composite material.

A center aperture 110 in the pulley wheel body 102 extends from an outer surface 118 of a first outer wheel portion 108*a*, through the rope saddle portion 106, to another outer surface 118 of a second outer wheel portion 108*b*. The center aperture 110 is designed such that the pulley wheel body can rotate about a rope threaded through the center aperture 110. Accordingly, to prevent wear on the rope threaded through the center aperture 110, a center aperture surface 112 is curved between the outer wheel portion outer surfaces 118. For example, as shown in FIG. 2, the center aperture surface 112 is curved such that a radius of the center aperture 110 is larger where the center aperture surface 112 meets the outer wheel portion outer surfaces 118 and smaller at the rope saddle portion 106.

In some implementations, the center aperture surface 112 may include a surface coating, such as polytetrafluoroethene (PTFE), i.e., Teflon. In these implementations, the PTFE surface is in contact with a soft shackle rope threaded through the center aperture 110. As the pulley wheel body 102 rotates during use, the PTFE coating on the center aperture surface 112 reduces wear on the soft shackle and friction between the center aperture surface 112 and the soft shackle rope. The PTFE coating may be applied to the center aperture surface 112 by, for example, applying a coating to the center aperture surface 112 and removing any excess coating from the center aperture surface 112. The remaining PTFE impregnates the center aperture surface 112, reducing friction between the center aperture surface 112 and extending the life of the soft shackle rope.

Figure 2:
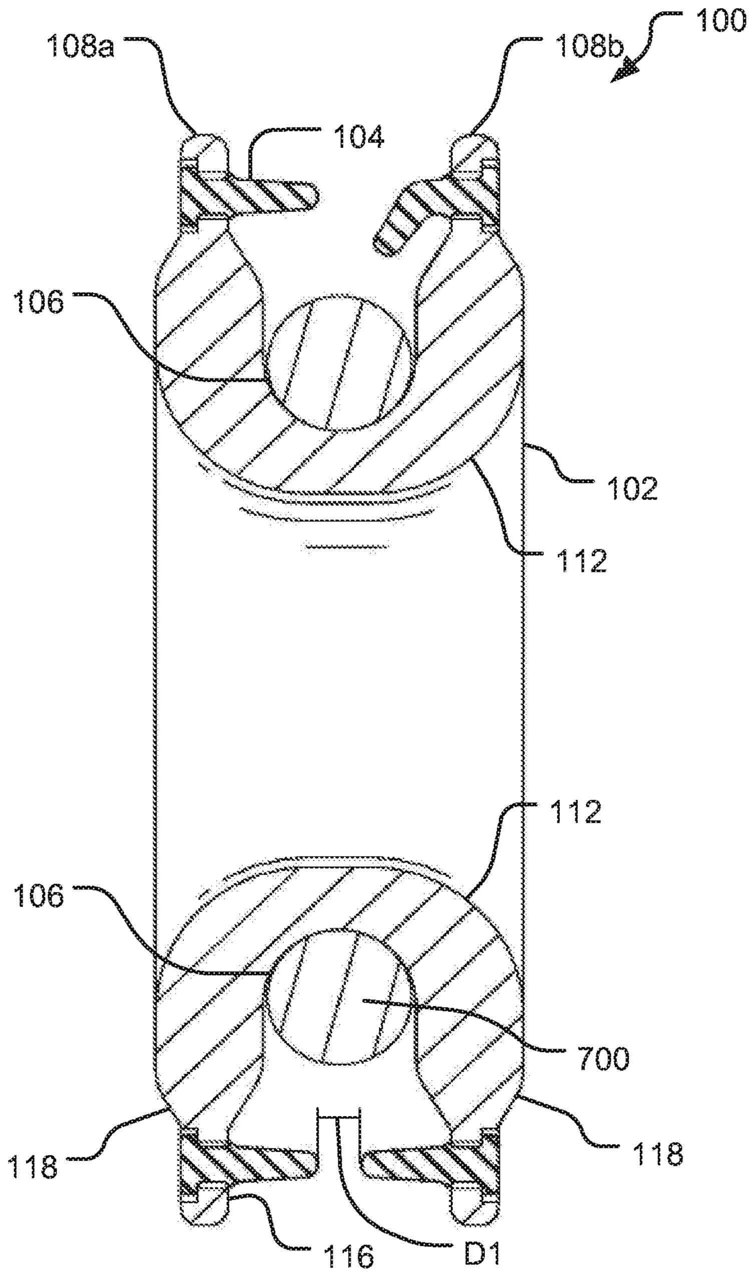
FIG. 2 is a section view of a snatch ring pulley assembly, taken along line 2-2 of FIG. 1.
Figure 3A:
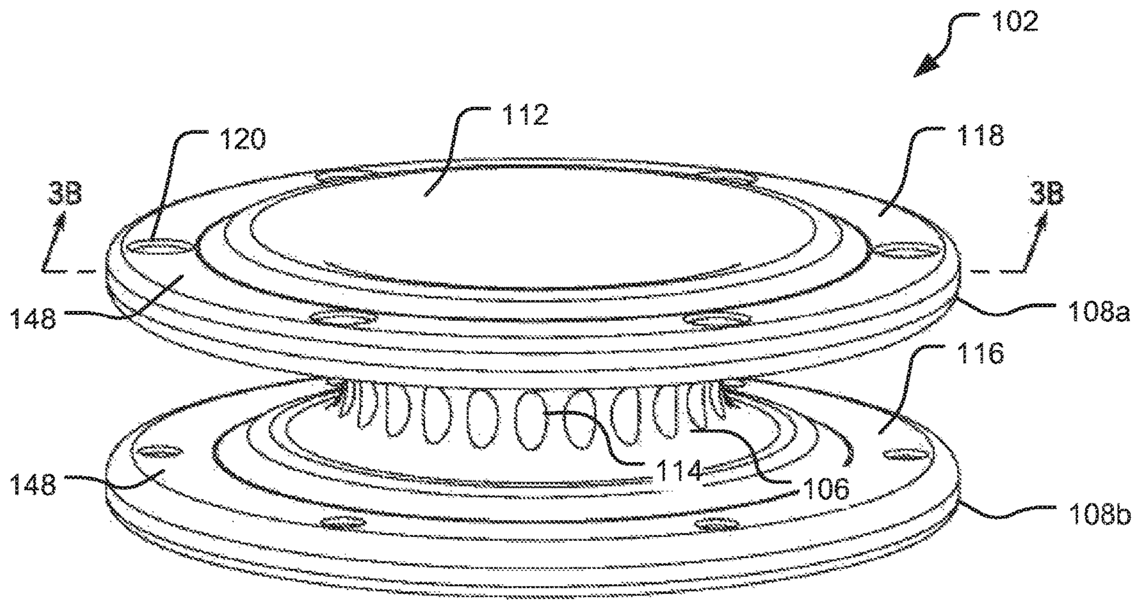
FIG. 3A is an isometric view of the pulley wheel body.

The rope saddle portion 106 of the pulley wheel body 102 is curved to accommodate a rope 700 within the rope saddle, as shown in FIG. 2. The curve of the rope saddle portion 106 may be a circular segment such that the curve generally follows a cross-sectional curve of the rope 700 within the rope saddle portion 106. In some implementations, the rope saddle portion 106 may include one or more traction features. For example, as shown in FIG. 3A, the rope saddle portion 106 may include grooves 114. The grooves 114 may be generally perpendicular to the longitudinal direction of a length of rope within the rope saddle portion 106. Edges where the grooves 114 meet the surface of the rope saddle portion 106 may be smoothed to prevent wear on the rope. The grooves 114 may have a variety of cross-sectional shapes, such as, for example, curved bottoms, square bottoms, or "V" shaped grooves. In other implementations, other traction features, such as a spray-on friction coating on the surface of the rope saddle portion 106, may be used.

Figure 3B:
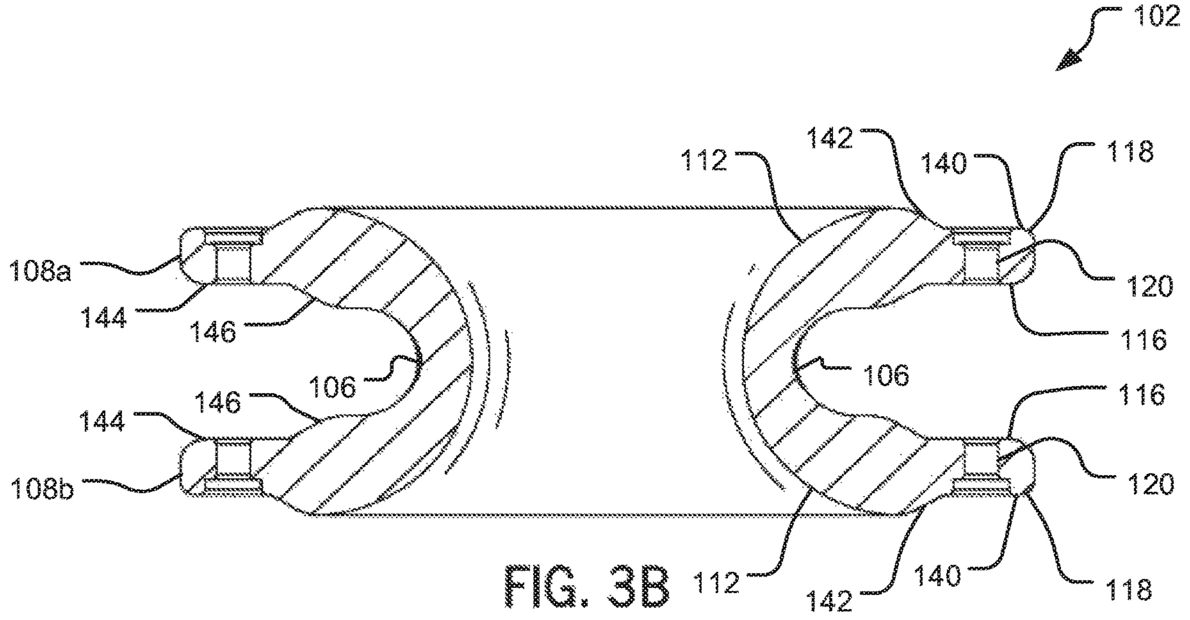
FIG. 3B is a section view of the pulley wheel body taken along line 3B-3B of FIG. 3A.

The outer wheel portions 108*a/b* of the pulley wheel body 102 are spaced apart by the rope saddle portion 106 and include inner surfaces 116 and outer surfaces 118. As shown in FIGS. 3A and 3B, the outer surfaces 118 include an annular outer flat portion 140 and an annular outer curved portion 142, with the annular outer curved portion 142 connecting the annular outer flat portion 140 to the center aperture surface 112. Similarly, the inner surfaces 116 of the outer wheel portions 108*a/b* include an annular inner flat portion 144 and an annular inner curved portion 146, with the annular inner curved portion 146 connecting the annular inner flat portion 144 to the rope saddle portion 106. The annular outer flat portion 140 and the annular inner flat portion 144 are generally parallel to each other. For each of the two outer wheel portions 108*a/b*, a curved outer rim 148 is formed between an outer edges of the inner surface 116 and the outer surface 118.

Figure 3C:
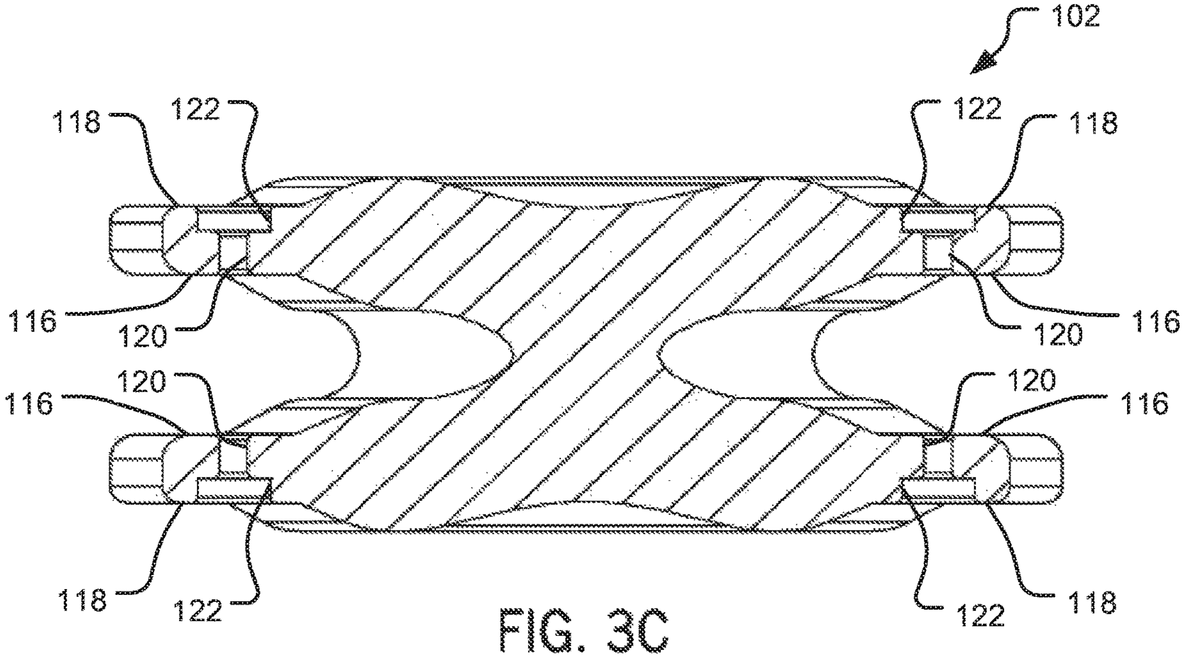
FIG. 3C is a section view of the pulley wheel body taken along line 3C-3C of FIG. 3A.

As shown in FIGS. 3A and 3C, the outer wheel portions 108*a/b* may include evenly spaced through-holes 120 extending from the outer surface 118 to the inner surface 116. In some implementations, such as the pulley wheel body 102, the through-holes 120 are located such that a through-hole 120 on the first outer wheel portion 108*a* is directly across from a through-hole 120 on the second outer wheel portion 108*b*. The through-holes 120 may include a counterbore 122, extending inwardly from the outer surface 118, as shown in FIG. 3C.

Figure 4:
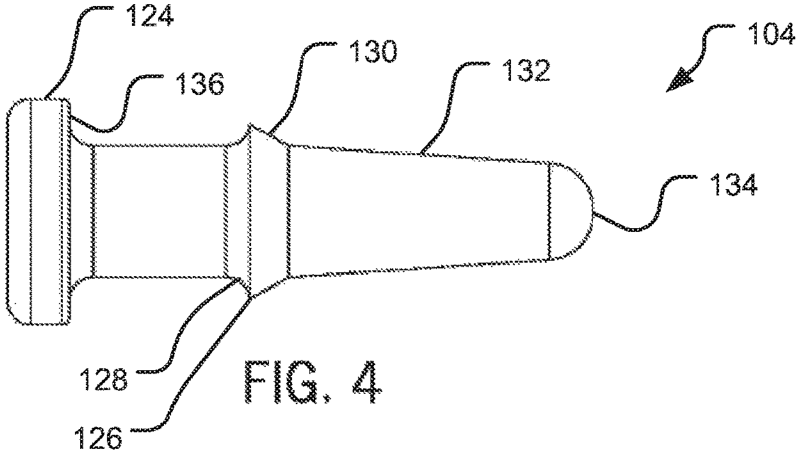
FIG. 4 is an isometric view of a finger of a snatch ring pulley assembly.

In the embodiment of the snatch ring pulley assembly 100, the rope retention feature is composed of a plurality of flexible fingers 104 seated within the through holes 120. A single flexible finger 104 is shown in FIG. 4. The flexible finger 104 may be made of, for example and without limitation, silicone, rubber, or another flexible, elastomeric material. Preferably, the flexible finger 104 includes a head 124 with a head radius and an annular clip 126 with a clip radius spaced apart from the head 124 along a length of a shaft of the finger 104. The clip radius and the head radius are larger than other radii of the flexible finger measured from a central axis of the flexible finger 104 extending from the head 124 to an inner tip 134 of the flexible finger 104. The head radius may be congruent with the radius of the counterbore 122 in the outer surface 118 of the outer wheel portions 108*a/b* and thickness of the head 124 may be congruent with a depth of the counterbore 122. In other embodiments, the radius of the head 124 may be less than the radius of the counterbore 122, but greater than the radius of the through-hole 120.

As shown in FIG. 4, the head 124 is generally cylindrical in shape and includes a substantially flat bottom surface 136. The annular clip 126 may be a variety of shapes. For example, in the implementation shown in FIG. 4, the annular clip 126 is formed as a frustum-shaped annular barb formed by a slightly curved proximal surface 128 and a tapered distal surface 130. A length of the flexible finger 104 extending between the proximal surface 128 of the ridge and the bottom surface 136 of the head 124 is generally cylindrical in shape and may be congruent with a thickness of the outer wheel portions 108*a/b* between the annular outer flat portion 140 of the outer surfaces 118 and the inner flat portion 144 of the inner surfaces. An extension 132 of the flexible finger 104 extending from the tapered distal surface 130 of the annular clip 126 to the inner tip 134 may be substantially cylindrical, tapered, or curved.

Figure 5:
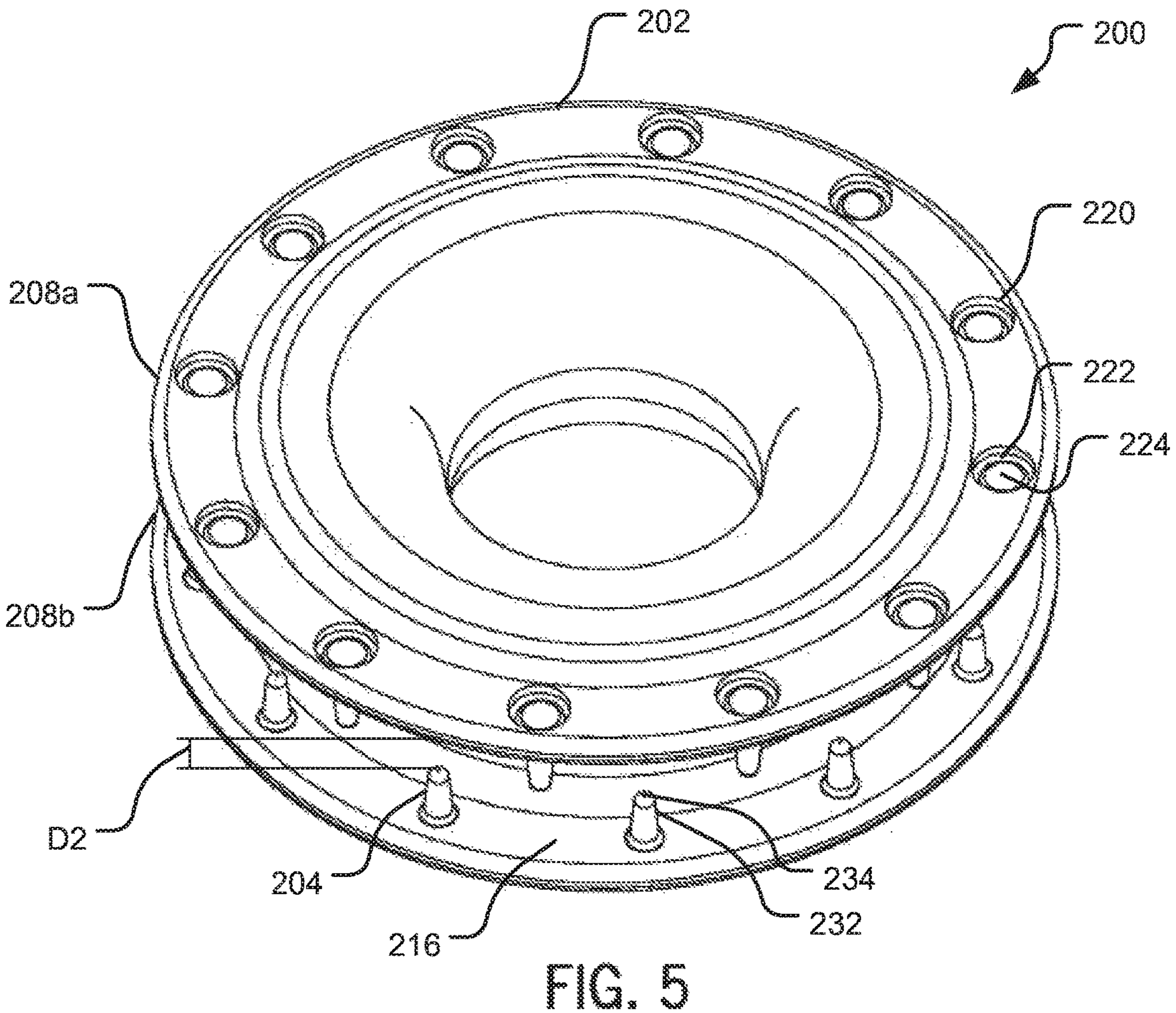
FIG. 5 is an isometric view of an implementation of a snatch ring pulley assembly.
Figure 6A:
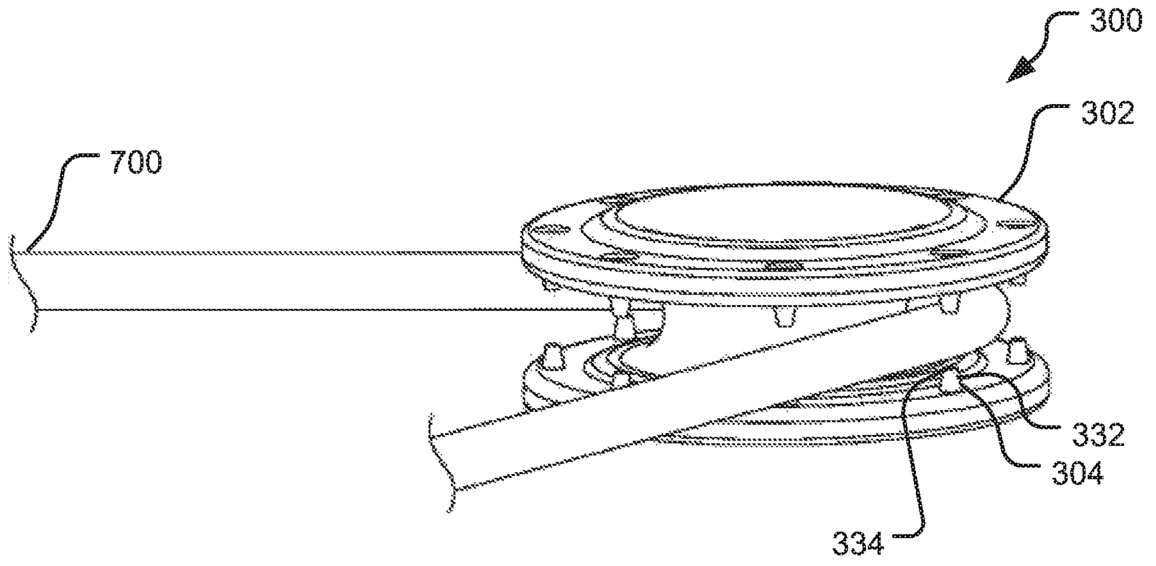
FIG. 6A is an isometric view of the snatch ring pulley assembly with a rope engaged in the snatch ring pulley assembly.
Figure 6B:
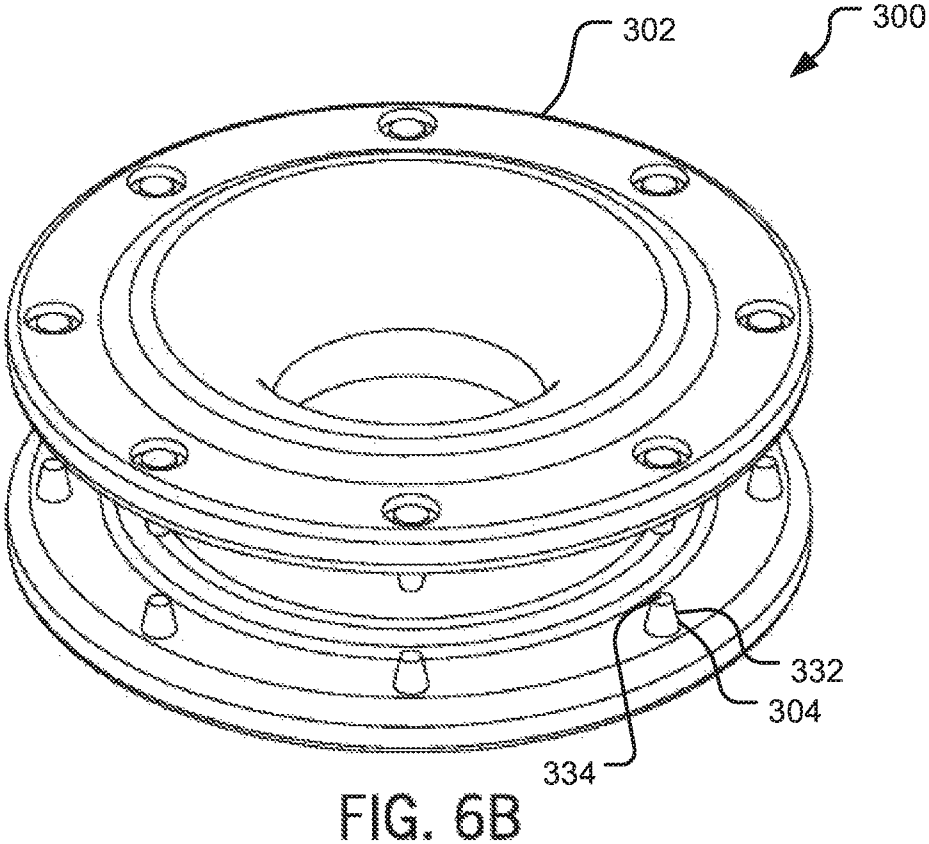
FIG. 6B is an isometric view of the snatch ring pulley assembly.

In other implementations, for example, as shown in FIGS. 5, 6A, and 6B, the size, form and position of fingers 204, 304, may vary. In FIGS. 5, 6A, and 6B, like structural elements as in the embodiment of FIGS. 1-4 are designated by similar reference numbers in respective series beginning with 200 and 300, respectively, rather than 100. FIG. 5 depicts an alternate snatch ring pulley assembly 200 in which through-holes 220 are staggered such that a through-hole 220 on one outer wheel portion 208*a* is not directly across from a through-hole 220 in the other outer wheel portion 208*b*. In addition, the length of the fingers 204 is shorter than the length of the fingers in FIGS. 1-4. In a further exemplary implementation as depicted in FIGS. 6A and 6B, flexible fingers 304 may be similar to the flexible finger 104 shown in FIG. 4. However, the flexible fingers 304 may have a substantially shorter extension 332 than the flexible fingers 104. The flexible fingers 304 may also define an inner tip 334 that may be rounded or substantially flat and which may have a larger radius than a radius of the inner tip 134 of the finger 104 of FIG. 4.

Snatch Ring Pulley with Flexible Fingers Retention Feature—Assembly

As shown in FIG. 1, the flexible fingers 104 are fitted into the through-holes 120 in the pulley wheel body 102. The extensions 132 of the flexible fingers 104 protrude from the outer wheel portion inner surface 116. The head 124 of each finger 104 seats within the corresponding bore hole 122 of the through-hole 120 in which the finger 104 is inserted. The flat outer surface of the head 124 of each finger may be flush with or recessed from the annular outer flat portion 140. The annular clip 126 may be substantially compressible to be pressed through the through-hole 120 with a moderate force. The proximal surface 128 of the annular clip 126 seats against the annular inner flat portion 144 of the outer wheel portions 108*a/b*. Because the radius of the annular clip 126 is greater than the radius of the through-hole 120, the annular clip 126 is prevented from being pulled out of the through-hole 120 in the direction of the head 124 and is thus fixed within the through-hole 120. Additionally, because the through-holes 120 are positioned such that a through-hole 120 in the first outer wheel portion 108*a* is directly opposite a through-hole 120 in the second outer wheel portion 108*b*, the flexible fingers 104 are also opposed, as shown in FIG. 1. Generally, the length of the extensions 132 of the flexible fingers 104 is such that the extensions 132 extend over the rope saddle portion 106 with the inner tips 134 of opposing fingers 104 spaced apart from each other.

In the alternative embodiment of FIG. 5, the snatch ring pulley assembly 200 includes a pulley wheel body 202 including through holes 220. A plurality of flexible fingers 204 are fitted into the through holes 220 as in the embodiment of FIGS. 1-4. Extensions 232 of the flexible fingers 204 protrude from the inner surfaces 216 of the outer wheel portions 108*a/b* and extend over part of the rope saddle portion 206. In the snatch ring pulley assembly 200, the through holes 220 are staggered such that when the flexible fingers 204 are fitted in the through holes 220, a flexible finger 204 in one outer wheel portion 208*a* is not opposed to a flexible finger 204 protruding from the other outer wheel portion 208*b*. The extensions 232 of the flexible fingers 204 extend from one inner surface 216 toward the opposite inner surface 216, with a gap between an inner tip 234 of the flexible finger 204 and the opposing inner surface 216.

The flexible fingers 204 are located in the through-holes 220 in the pulley wheel body 202 such that the head 224 of the flexible finger 204 seats in the counterbore 222 of the through-hole 220. The height of the head 224 of the flexible finger 204 is generally slightly less than the depth of the counterbore 222, such that an object contacting the outer surface of the pulley wheel body does not contact the head 224 of the flexible finger 204. The clip (not visible in FIG. 5) of the flexible finger 204 is located such that the proximal surface of the clip seats against the annular inner flat portion of the outer wheel portions 208*a/b*. When the flexible fingers 204 are assembled in the through holes 220 of the pulley wheel body 202, the flexible fingers 204 are staggered, such that the inner tip 234 of a flexible finger 204 is not directly opposite the inner tip 234 of a flexible finger mounted on the other outer wheel portion of the pulley wheel body 202.

In the alternate embodiment of FIGS. 6A and 6B, the flexible fingers 304 fit in the pulley wheel body 302 to form the snatch ring assembly 300 in a similar manner as the flexible fingers 104 fit in the pulley wheel body 102. In this embodiment the length of the flexible fingers 304 is shorter than in the prior embodiments. Other embodiments are also possible. For example, the fingers on opposing sides of the outer wheel portions can be of varying lengths in either the directly opposing or staggered configurations. For example, in a directly opposing configuration, a flexible finger on one outer wheel portion can be longer than the flexible finger directly opposing it on the opposite outer wheel portion. The width of the gap between opposing fingers or a finger and an opposing inner surface may also be varied within the same snatch ring pulley assembly or as between different models. For example, a different gap sizes may be used to accommodate ropes of different diameters.

Snatch Ring Pulley with Flexible Fingers Retention Feature—Operation

In use, the snatch ring pulley assembly 100 provides a mechanical advantage to a winching operation. The snatch ring pulley assembly 100 is generally used in conjunction with a winch rope 700, e.g., a synthetic winch line, spooled on a powered winch mounted on a vehicle (referred to herein as the "winch vehicle"). A rope shackle 702 or other rope or web or strap is attached to the snatch ring pulley assembly 100 by passing the rope shackle 702 through the center aperture 110 of the pulley wheel body 102 as shown in FIG. 1. The rope shackle 702 may be used to anchor the snatch ring pulley assembly 100 via a tow strap, chain, rope, etc. to either a fixed point or to a vehicle or other object to be pulled by the winch line. As shown in FIGS. 1 and 2, the winch rope 700, unwound from the winch, is seated in the rope saddle portion 106 of the pulley wheel body 102. The distal end of the winch rope 700 may be attached to the vehicle or object to be pulled.

Alternatively, if the rope shackle 702 is attached to the vehicle or object to be pulled (e.g., via a tow strap), the distal end of the winch rope 700 may be attached to a fixed point either on or adjacent to the winch vehicle. In yet another use, the winch vehicle may need to pull itself (e.g., out of a stuck position or up a steep incline). In such a configuration, the snatch ring pulley assembly 100 may be attached to a fixed point via a tow strap and the distal end of the winch rope 700 may be attached to a second fixed point on the winch vehicle itself.

As the winch rope 700 is pulled (i.e., retracted by the winch), the pulley wheel body 102 rotates on the rope shackle 702, which functions as an axle, as the distal end of the winch rope 700 moves relatively toward the pulley wheel body 102 and the proximal length of the winch rope 700 moves relatively away from the pulley wheel body 102 (i.e., to be spooled on the winch) as indicated by the directional arrows in FIG. 1. As noted, the center aperture surface 112 of the center aperture 110 may be coated with a friction reducing material in order to reduce wear on the rope shackle 702 as the snatch ring pulley assembly 100 rotates on it.

Thus, when the powered winch operates, the winch rope 700 moves around the rope saddle portion 106 of the pulley wheel assembly 102 and the snatch ring pulley assembly 100 provides a mechanical advantage to the winch.

Before tension is placed upon the winch rope 700, or when tension is released from the winch rope 700, the snatch ring pulley assembly 100 is not supported and will fall to the ground if not otherwise held. However, it is inherently unsafe for a person to hold the winch rope 700 or the snatch ring pulley 100 (or otherwise be in between the winch, the fixed point, and a vehicle being pulled). At such times, the winch rope 700 is not firmly held within the rope saddle portion 106. The traction features 114 are provided to prevent slippage of the winch rope 700 about the pulley wheel body 102, but they do not function to retain the winch rope within in the rope saddle portion 106 as the winch rope 700 needs to freely enter and exit the rope saddle portion 106 as the snatch ring pulley assembly 100 rotates. It is important, however, for the winch rope 700 to remain seated between the outer wheel portions 108*a/b* so that when tension is placed upon the winch rope 700, the winch rope 700 seats in the rope saddle portion 106. If the winch rope 700 falls outside the outer wheel portions 108*a/b* and is then placed under tension, it will pull on and slide against the rope shackle 702 during winch operation and potentially damage and weaken the rope shackle 702 due to the friction created.

In the embodiment of the snatch ring pulley assembly 100, the flexible fingers 104 surrounding the circumferential edges of the outer wheel portions 108*a/b* function as retention features to retain the winch rope 700 within the rope saddle portion 106 of the snatch ring pulley assembly 100 when the winch rope 700 is slack. The flexible fingers 104 are located generally radially outward from the winch rope 700 in the rope saddle portion 106. As shown in FIG. 2, the separation distance D1 between the tips of opposing fingers 104 is less than the diameter of the winch rope 700. The fingers 104, although flexible, are sufficiently resilient to retain the winch rope 700 within the outer wheel portions 108*a/b* when the winch rope 700 is slack. If slack is introduced in the winch rope 700, the retention feature 104 guides the winch rope 700 towards the rope saddle portion 106 to lessen the probability that the winch rope 700 will slip out of the pulley wheel assembly 100, interfering with operation of the powered winch.

In implementations where the rope saddle portion 106 includes a traction feature (e.g., grooves 114), the traction feature also helps to keep the winch rope 700 from slipping out of the rope saddle portion 106. Further, as shown in FIG. 2, the flexible fingers 104 deform where the winch rope 700 enters and exits the snatch ring assembly 100. Thus, when the winch rope 700 is placed under tension and a proximal portion is pulled toward the winch, the resilient finger 104 deform or flex out of the way at continuously changing entrance and exit points of the winch rope 700 as the snatch ring pulley assembly 100 rotates. Accordingly, the snatch ring pulley assembly 100 can be used with a winch rope 700 at a variety of entrance and exit angles and locations relative to the exterior circumference of the snatch ring pulley assembly 100 without damaging the winch rope 700.

The snatch ring pulley assemblies 200 and 300 depicted in FIGS. 5-6B operate in a substantially similar manner to the snatch ring pulley assembly 100. In the snatch ring pulley assembly 200, a winch rope 700 in the rope saddle portion (not visible in FIG. 5) is retained by a staggered arrangement of flexible resilient fingers 204. As shown in FIG. 5, the separation distance D2 between the tips of fingers 204 and an opposing inner surface 216 is less than the diameter of the winch rope 700. As the winch rope 700 enters and exits the pulley wheel body 202, the winch rope 700 may deform one flexible finger 204 at an entrance point and one flexible finger 204 at an exit point due to the staggering of the flexible fingers 204.

In the snatch ring pulley assembly 300 as shown in FIGS. 6A and 6B, the flexible fingers 304 may be shorter and stiffer and thereby not deform as much as the flexible fingers 104 because of their shorter length. The separation distance between opposing fingers 304 may thereby be greater in order to accommodate a larger diameter winch rope 700. In this embodiment, the surface of the rope 700 contacts the rounded inner tip 334 of the flexible fingers 304 instead of a sidewall surface of the extension portion. This embodiment may provide for easier ingress and egress of larger diameter winch ropes 700 while still providing retention.

Snatch Ring Pulley with Continuous Retention Feature—Components

Alternative embodiments of snatch ring pulley systems 400, 500 with continuous annular protrusions as retention features are depicted in FIGS. 7A-13. In FIGS. 7A-13, like structural elements as in the embodiment of FIGS. 1-4 are designated by similar reference numbers in respective series beginning with 400 or 500 rather than 100. In the exemplary embodiment of FIGS. 7A-9, the snatch ring pulley assembly 400 generally includes a pulley wheel body 402 and a rope retention structure in the form of two continuous annular rib features 404. The pulley wheel body 402 is substantially the same as the pulley wheel body 102 described above, except that the pulley wheel body 402 does not include through holes. Instead, an inner surface 416 and an outer surface 418 of the outer wheel portions 408*a/b* are continuous.

Figure 8:
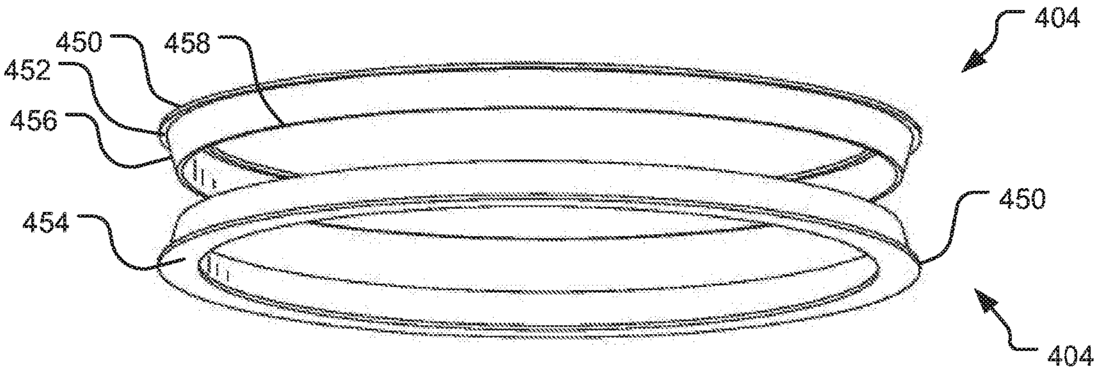
FIG. 8 is an isometric view of a continuous feature of an implementation of the snatch ring pulley assembly.
Figure 9:
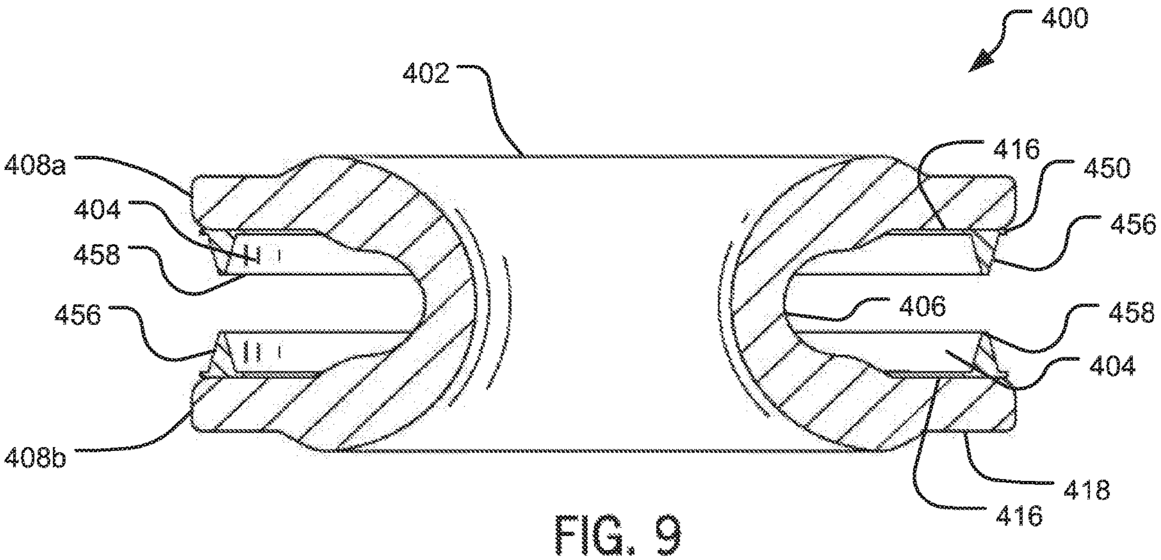
FIG. 9 is a section view of an implementation of the snatch ring pulley assembly, taken along line 9-9 of FIG. 7B.
Figure 10:
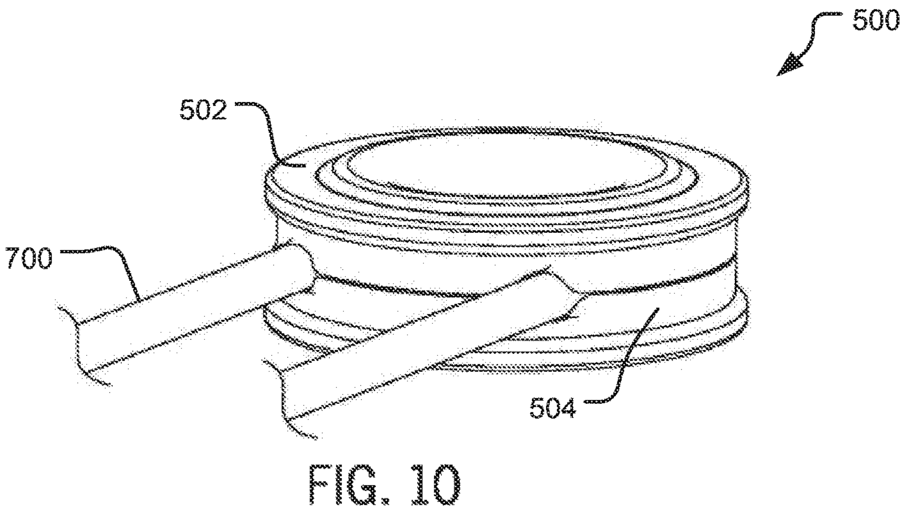
FIG. 10 is an isometric view of an implementation of the snatch ring pulley assembly with a rope engaged in the snatch ring assembly.

Each continuous annular rib feature 404 is generally ring shaped and made of a flexible, resilient material, such as silicone. As shown in FIGS. 8 and 9, the continuous annular rib feature 404 is formed with a flat base 450 and an annular wall 456 extending from the flat base 450. The flat base 450 has a generally rectangular cross-section that may extend laterally on each side of the annular wall 456 to form lips 452. The flat base 450 provides coupling surface 454 that forms a base of the continuous annular rib feature 404. The coupling surface 454 of the flat base 450 may be adhered to the inner surface 416 of each of the outer wheel portions 408*a/b*. The lips 452 may provide greater surface area for adhesion and may help resist peeling forces as the winch rope 700 moves past the annular rib feature 404. The annular wall 456 may have a generally triangular cross-section (in this case isosceles), but other cross-sectional shapes are possible. The annular wall 456 terminates at an inner edge 458. The inner edge 458 may be a true corner edge surface or, as shown in FIGS. 8 and 9, may be a flat surface.

Figure 11:
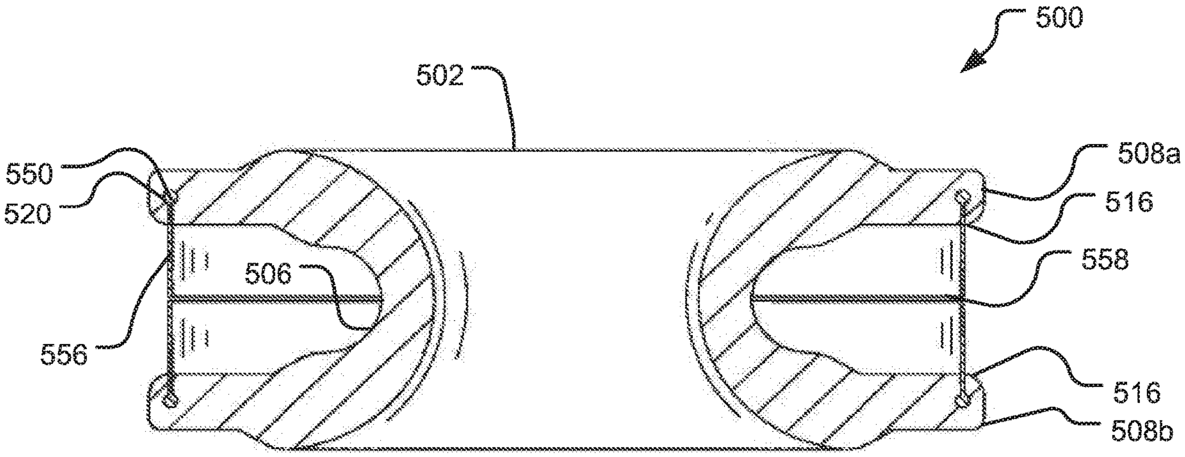
FIG. 11 is a section view of an implementation of the snatch ring pulley assembly, taken along line 11-11 of FIG. 10.
Figure 12:
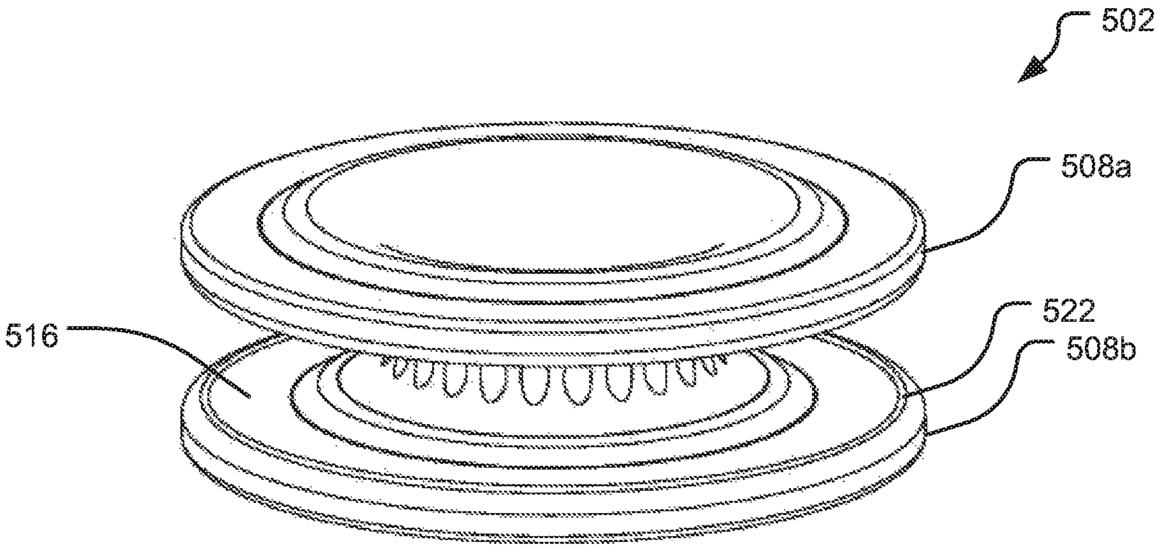
FIG. 12 is an isometric view of a pulley wheel body of an implementation of the snatch ring pulley assembly.
Figure 13:
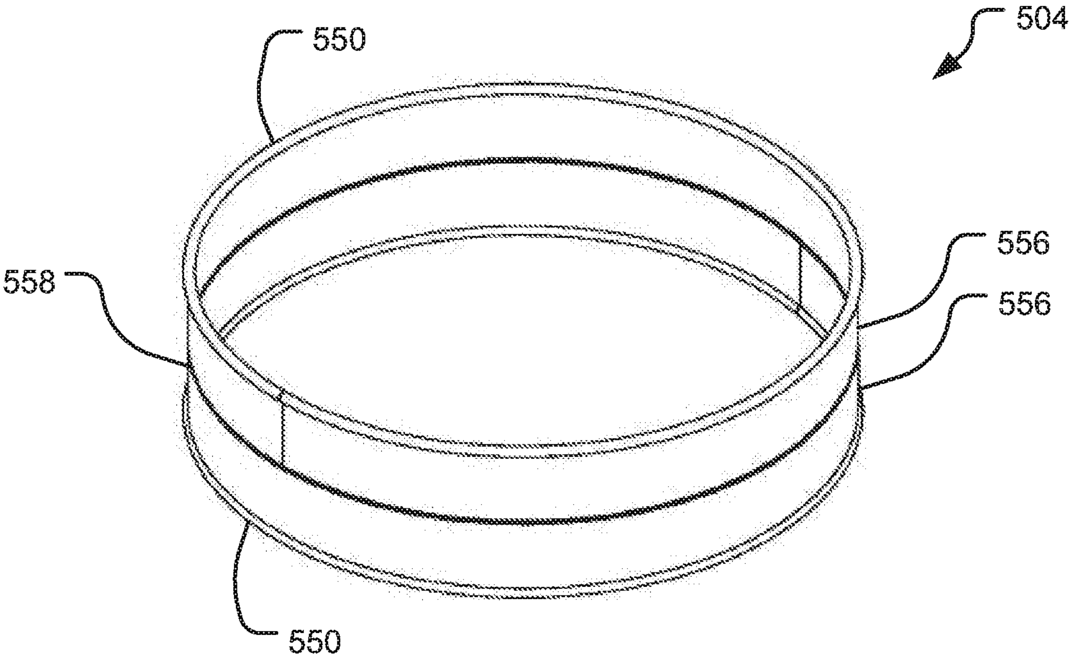
FIG. 13 is an isometric view of a fin of an implementation of the snatch ring pulley assembly.

In the embodiment shown in FIGS. 10-13 the snatch ring pulley assembly 500 generally includes a pulley wheel body 502 and a rope retention structure in the form of two continuous, thin annular walls 504. The pulley wheel body 502 of the snatch ring pulley systems 500 is substantially the same as the pulley wheel body 102 described above, except that the pulley wheel body 502 does not include through holes. The pulley wheel body 502 defines an annular groove 522 extending from the inner surfaces 516 of the outer wheel portions 508*a/b*. A base retention portion 520 of each annular groove 522 may have an enlarged cross section compared to a portion of the annular groove 522 closer to the inner surface 516. As shown in FIG. 12, the annular groove 522 extends in a complete circle inside of the perimeter of the outer wheel portions 508*a/b*.

Each continuous annular wall 504 generally forms a ring. The annular wall 504 may be made of silicone or a similarly flexible, resilient material. A coupling feature 550 (e.g., a linear bead) at a base of each annular wall 504 seats within the base retention portion 520 of the annular groove 522 and may have the same cross-section as the base retention portion 520. As in the depicted implementation, both the base retention portion 520 and the coupling feature 550 may have a circular cross-section. In some implementations, base retention portion 520 and the coupling feature 550 may have a different cross-sectional shape, such as, for example, an oval cross-section, a rectangular cross-section, or a square cross-section. A web or fin 556 protrudes from the coupling feature 550. Each fin 556 may have a generally rectangular cross-section. Each fin 556 may extend from the coupling feature 550 and through the annular groove 522 beyond and generally perpendicular to the inner surfaces 516 of the outer wheel portions 508*a/b* and terminate at an inner edge 558. The fins 556 extending from each of the outer wheel portions 508*a/b* may align with each other such that the inner edges 558 of the opposing fins 556 touch each other or are only slightly separated.

Snatch Ring Pulley with Continuous Retention Feature—Assembly

Figure 7A:
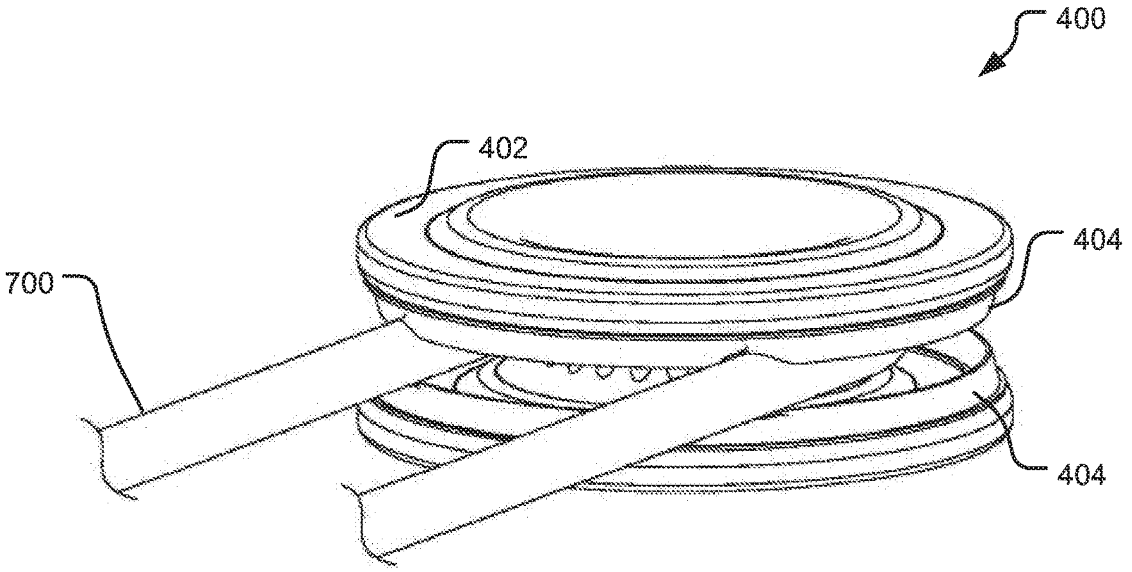
FIG. 7A is an isometric view of the snatch ring pulley assembly with a rope engaged in the snatch ring pulley assembly.
Figure 7B:
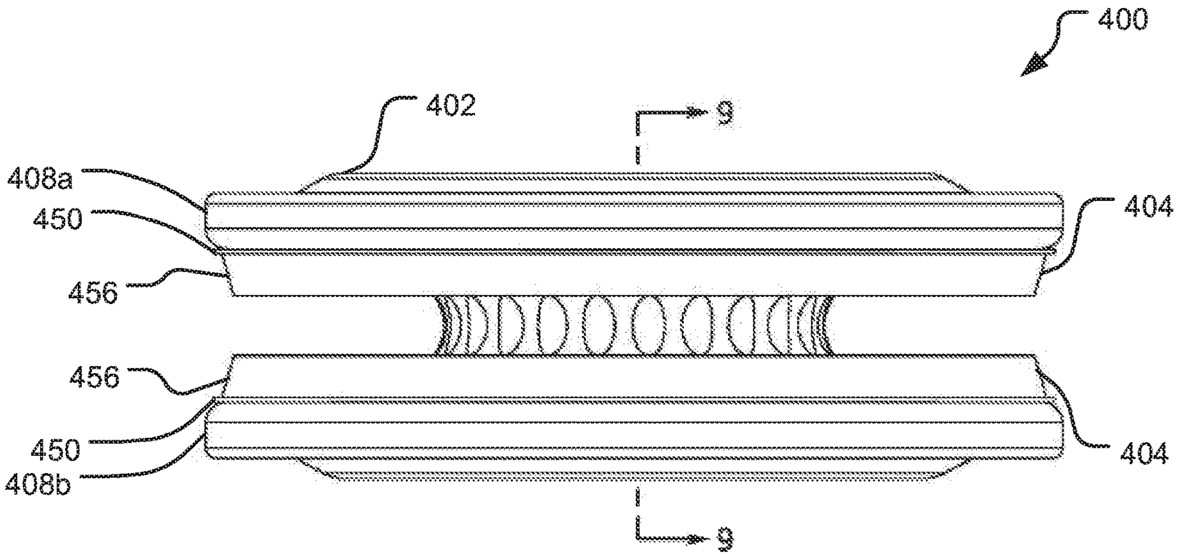
FIG. 7B is an isometric view of the snatch ring pulley assembly.

The snatch ring pulley assembly 400 is formed by the pulley wheel body 402 and the two continuous annular rib features 404. As shown in FIG. 7B, one annular rib feature 404 is affixed to each inner surface 416 of the pulley wheel body 402. As shown in the section view of the snatch ring pulley assembly 400 in FIG. 9, the coupling surface 454 of the annular rib feature 404 contacts the inner surface 416 of the pulley wheel body 402. In some implementations, an adhesive may be used to affix the annular rib features 404 to the pulley wheel body 402. When the annular rib features 404 are affixed to the pulley wheel body 402, the outer lip 452 of the flat base 550 of the annular rib feature 404 may be roughly coincident with an outer circumference of the inner surface 416.

The continuous features 404 are affixed to the inner surfaces 416 such that the inner edges 458 of the annular rib features 404 are roughly aligned. In some implementations, there is a space between the inner edges 458 of the annular rib features 404. In other implementations, the inner edges 458 of the annular rib features 404 may contact each other. The size of the space between the inner edges 458 of the annular rib features 404 varies with the size of the annular walls 456 of the annular rib features 404 and the dimensions of the rope saddle portion 406 of the pulley wheel body 402. A larger space between the inner edges 458 of the annular rib features 404 may be used, for example, to accommodate a larger rope within the rope saddle portion 406 of the pulley wheel body 402.

The snatch ring pulley assembly 500 is formed by the pulley wheel body 502 and the two annular walls 504. As shown in FIG. 11, the coupling feature 550 fits into a corresponding base retention portion 520 of the annular groove 522 in the pulley wheel body 502. In some embodiments, the coupling feature 550 may be seated within the base retention portion 520 by a forced insertion. In other embodiments, the annular walls 504 may be overmolded in place onto the outer wheel portions 508*a/b* of the pulley wheel body 502 whereby the coupling feature 550 is injected into and forms in place within the base retention portion 520. Each fin 556 of the annular wall 504 extends from the inner surface 516 toward the opposing fin 556. When both annular walls 504 are coupled with the pulley wheel body 502, the inner edge 558 of each continuous fin 556 is substantially opposed to the inner edge 558 of the other continuous fin 556.

In one implementation, the snatch ring pulley assembly 500 includes only a small gap between the inner edges 558 of the annular walls 504. Accordingly, the annular walls 504 substantially cover the rope saddle portion 506 of the pulley wheel body 502. In other implementations, the fins 556 of the annular walls 504 may be shorter, leading to a larger space between the inner edges 558 of the continuous fins 556.

In some implementations, the annular rib features 404 may include a coupling feature similar to the coupling feature 550 and may fit within an annular groove in the pulley wheel body 402 similar to the annular groove 522 in the pulley wheel body 502. Similarly, in some implementations, the pulley wheel body 502 may be formed without an annular groove 522 and the annular walls 504 may be formed with a flat base with a coupling surface similar to the coupling surface 454 and may be affixed to the inner surface 516 of the pulley wheel body 502.

Snatch Ring Pulley with Continuous Retention Feature—Operation

The snatch ring pulley assemblies 400 and 500 have a similar operation to the snatch ring pulley assembly 100 described above. As shown in FIG. 7A, when a winch rope 700 is seated in the rope saddle portion 406 of the pulley wheel body 402 of the snatch ring pulley assembly 400, the annular rib features 404 may deform at continuously changing entrance and exit points of the winch rope 700 between the annular rib features 404 to accommodate the winch rope 700 as the pulley wheel body 402 rotates. However, the annular rib features 404 act as a barrier for the portion of the winch rope 700 seated in the rope saddle portion 406 of the pulley wheel body 402. Accordingly, the portion of the winch rope 700 seated in the rope saddle portion 406 is less likely to slip out of the rope saddle portion 406 when tension on the winch rope 700 is slack and, for example, the snatch ring pulley assembly 400 drops to the ground.

Similarly, when the winch rope 700 is seated in the rope saddle portion 506 of the pulley wheel body 502 of the snatch ring pulley assembly 500, the annular walls 504 deform at continuously changing entrance and exit points of the winch rope 700 between the annular walls 504 to accommodate the winch rope 700 as the pulley wheel body 502 rotates. The continuous fins 504 act as a barrier for the portion of the winch rope 700 seated in the rope saddle portion 506 of the pulley wheel body 502. Accordingly, the portion of the winch rope 700 seated in the rope saddle portion 506 is less likely to slip out of the rope saddle portion 506 when tension on the winch rope 700 is slack and, for example, the snatch ring pulley assembly 500 drops to the ground. Because the annular rib features 404 and annular walls 504 are continuous around the pulley wheel bodies 402 and 502, respectively, the snatch ring pulley assemblies 400 and 500 can be used with a winch rope 700 at a variety of exit angles. Further, because the annular rib features 404 and the annular walls 504 are flexible, the winch rope 700 is not damaged as it enters and exits the snatch ring pulley assemblies 400 and 500.

Snatch Ring Pulley with Bristles Retention Feature—Components

Figure 16:
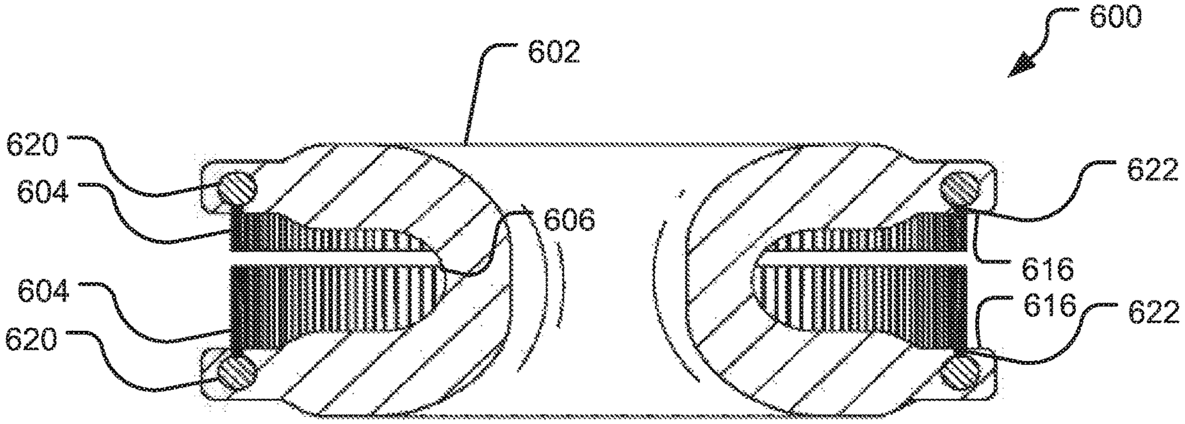
FIG. 16 is a section view of an implementation of the snatch ring pulley assembly, taken along line 16-16 of FIG. 15.
Figure 17:
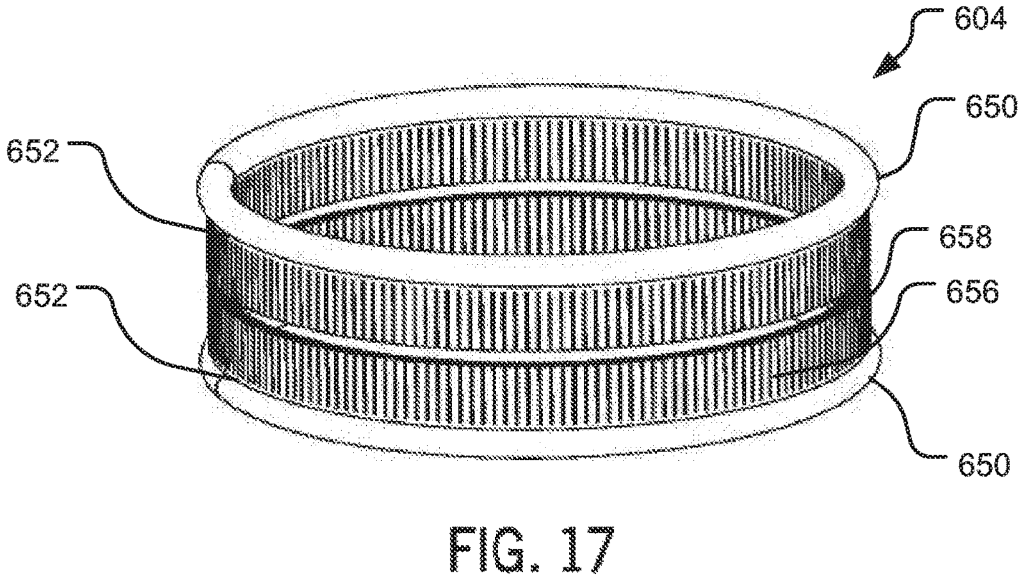
FIG. 17 is an isometric view of a bristle structure of an implementation of the snatch ring pulley assembly.

In another exemplary implementation, the snatch ring pulley assembly 600 generally includes a pulley wheel body 602 and a rope retention structure in the form of two bristle rings 604. In FIGS. 14-17, like structural elements as in the embodiment of FIGS. 1-4 are designated by similar reference numbers in respective series beginning with 600 rather than 100. The pulley wheel body 602 is substantially the same as the pulley wheel body 102 described above, except that the pulley wheel body 602 does not include through holes. The pulley wheel body 602 defines an annular groove 622 extending from the inner surfaces 616 of the outer wheel portions 608*a/b*. A base retention portion 620 of each annular groove 622 may have an enlarged cross-section compared to the portion of the annular groove 522 closer to the inner surface 616 as shown in FIG. 16. The annular groove 622 extends in a complete circle inside of the perimeter of the outer wheel portions 608*a/b*.

Each bristle ring 604 is formed by a plurality of individual bristles 656 extending in parallel and adjacent to each other from a coupling feature 650 (e.g., a linear bead) at a base of the bristle ring 604. A solid base wall 652 may extend from the coupling feature 650 and provide a solid, continuous surface from which each of the bristles 656 extends. The bristle ring 604 may be made of silicone or a similarly flexible, resilient material. The coupling feature 650 seats within the base retention portion 620 of the annular groove 622 and may have the same cross-section as the base retention portion 620. As in the depicted implementation, both the base retention portion 620 and the coupling feature 650 may have a circular cross-section. In some implementations, the base retention portion 620 and the coupling feature 650 may have a different cross-sectional shape, such as, for example, an oval cross-section, a rectangular cross-section, or a square cross-section. The bristles 656 may have a generally cylindrical shape and may extend beyond and perpendicular to the inner surfaces 616 of the outer wheel portions 608*a/b*. In an exemplary implementation, the base wall 652 may extend from the coupling feature 650 through the annular groove 622 such that a base of the bristles 656 is positioned at or above the inner surface 616. In some implementations, the bristle ring 604 may include a single layer of individual bristles 656 extending around the circumference of the coupling feature 650. In other implementations, a single bristle ring 604 may include two or more layers of individual bristles 656. For example, a single bristle ring 604 may include two layers of bristles 656 forming concentric circles extending from base wall 652 and the coupling feature 650. Further, in some implementations, the bristles 656 may be made from a different material than the coupling feature 650. The bristles 656 extending from each of the outer wheel portions 608*a/b* may align with each other such that the tips 658 of the opposing sets of bristles 656 may touch each other or may be slightly separated.

Snatch Ring Pulley with Bristles Retention Feature—Assembly

The snatch ring pulley assembly 600 is formed by the pulley wheel body 602 and two bristle rings 604. As shown in FIG. 16, the coupling feature 650 fits into the base retention portion 620 of the annular groove 622 in the pulley wheel body 602. In some embodiments, the coupling feature 650 may be seated within the base retention portion 620 by a forced insertion. In other embodiments, the bristle rings 604 may be overmolded in place onto the outer wheel portions 608*a/b* of the pulley wheel body 602 whereby the coupling feature 650 is injected into and forms in place within the base retention portion 620. In such an embodiment, the base wall 652 is formed within the annular groove 622 beyond the base retention portion 620 as a molding process expediency. The bristles 656 of each bristle ring 604 extend from the outer wheel portion inner surface 616 towards the opposing bristle ring 604. When both bristle rings 604 are coupled with the pulley wheel body 602, the tips 658 of the bristles 656 in each bristle ring 604 are substantially opposed to the tips 658 of the bristles 656 in the other bristle ring 604.

In one implementation, the snatch ring pulley assembly 600 includes only a small gap between the tips 658 of the bristles 656 in the bristle rings 604. Accordingly, the bristle rings 604 substantially cover the rope saddle portion 606 of the pulley wheel body 602. In other implementations, the bristles 656 of each of the bristle rings 604 may be shorter, leading to a larger space between the bristles 656 of the bristle rings 604. In some implementations, the pulley wheel body 602 may be formed without an annular groove 622 and the bristle rings 604 may be formed with a flat base with a coupling surface similar to the coupling surface 454 and may be affixed to the inner surface 616 of the pulley wheel body 602.

Snatch Ring Pulley with Bristles Retention Feature—Operation

Figure 14:
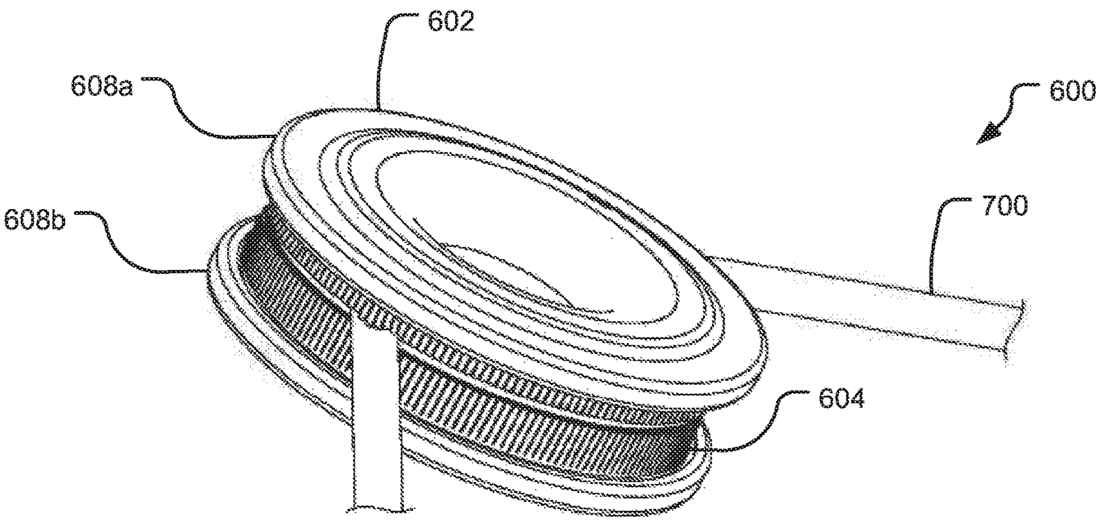
FIG. 14 is an isometric view of an implementation of the snatch ring pulley assembly with a rope engaged in the snatch ring assembly.
Figure 15:
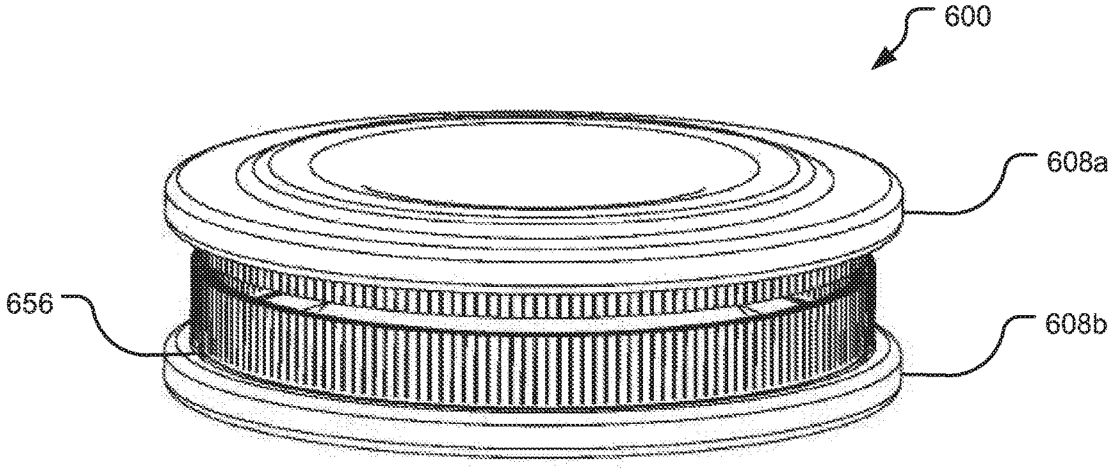
FIG. 15 is an isometric view of an implementation of the snatch ring pulley assembly.

The snatch ring pulley assembly 600 has a similar operation to the snatch ring assembly 100 described above. As shown in FIG. 14, when a winch rope 700 is seated in the rope saddle portion 606 of the pulley wheel body 602, the bristles 656 of the bristle rings 604 deform at continuously changing entrance and exit points of the winch rope 700 between the bristle rings 604 to accommodate the winch rope 700. However, the bristles 632 act as a barrier for the portion of the winch rope 700 seated in the rope saddle portion 606 of the pulley wheel body 602. Accordingly, the portion of the winch rope 700 seated in the rope saddle portion 606 is less likely to slip out of the rope saddle portion 606 when tension on the winch rope 700 is slack and, for example, the snatch ring pulley assembly 600 drops to the ground.

It should be noted that any of the features in the various examples and embodiments provided herein may be interchangeable and/or replaceable with any other example or embodiment. As such, the discussion of any component or element with respect to a particular example or embodiment is meant as illustrative only.

It should be noted that although the various examples discussed herein have been discussed with respect to clevis devices, the devices and techniques may be applied in a variety of applications, such as, but not limited to, towing, moving, winching, lifting, pulling, dragging, adjusting, or holding various items.

All directional references (e.g., upper, lower, upward, downward, left, right, leftward, rightward, top, bottom, above, below, vertical, horizontal, clockwise, and counterclockwise) are only used for identification purposes to aid the reader's understanding of the examples of the invention, and do not create limitations, particularly as to the position, orientation, or use of the invention unless specifically set forth in the claims. Joinder references (e.g., attached, coupled, connected, joined and the like) are to be construed broadly and may include intermediate members between the connection of elements and relative movement between elements. As such, joinder references do not necessarily infer that two elements are directly connected and in fixed relation to each other.

In some instances, components are described by reference to "ends" having a particular characteristic and/or being connected with another part. However, those skilled in the art will recognize that the embodiments are not limited to components which terminate immediately beyond their point of connection with other parts. Thus the term "end" should be broadly interpreted, in a manner that includes areas adjacent rearward, forward of or otherwise near the terminus of a particular element, link, component, part, member or the like.

In methodologies directly or indirectly set forth herein, various steps and operations are described in one possible order of operation but those skilled in the art will recognize the steps and operation may be rearranged, replaced or eliminated without necessarily departing from the spirit and scope of the present disclosure. It is intended that all matter contained in the above description or shown in the accompanying drawings shall be interpreted as illustrative only and not limiting. Changes in detail or structure may be made without departing from the broad understanding of the embodiments as defined in the appended claims.

What is claimed is:

1. A snatch ring pulley assembly comprising:

a pulley wheel body having a first outer wheel portion, a second outer wheel portion parallel to the first outer wheel portion, and a rope saddle portion defined between the first outer wheel portion and the second outer wheel portion, and defining a center aperture extending through the first outer wheel portion and the second outer wheel portion; and a first deformable retention feature affixed to the first outer wheel portion of the pulley wheel body, wherein the first deformable retention feature extends toward the second outer wheel portion, uniformly around and adjacent to an outer circumference of the first outer wheel portion, and between and perpendicular to both the first outer wheel portion and the second outer wheel portion, wherein the first deformable retention feature comprises a plurality of resilient fingers spaced apart from each other, wherein the rope saddle portion does not include any deformable retention features.

2. The snatch ring pulley assembly of claim 1 further comprising:

a second deformable retention feature affixed to the second outer wheel portion, wherein the second deformable retention feature extends toward the first outer wheel portion, uniformly around and adjacent to an outer circumference of the second outer wheel portion, and between and perpendicular to both the first outer wheel portion and the second outer wheel portion.

3. The snatch ring pulley assembly of claim 2, wherein the first deformable retention feature and the second deformable retention feature both comprise respective pluralities of resilient fingers spaced apart from each other.

4. The snatch ring pulley assembly of claim 3, wherein each of the resilient fingers of the first deformable retention feature are aligned with respective opposing resilient fingers of the second deformable retention feature.

5. The snatch ring pulley assembly of claim 3, wherein the pulley wheel body defines a plurality of through holes in the first outer wheel portion and a plurality of through holes in the second outer wheel portion;

the resilient fingers of the first deformable retention feature seat within the through holes in the first outer wheel portion; and the resilient fingers of the second deformable retention feature seat within the through holes in the second outer wheel portion.

6. The snatch ring pulley assembly of claim 1, wherein the deformable retention feature is in the form of a bristle ring including a plurality of flexible bristles extending from a base ring.

7. The snatch ring pulley assembly of claim 6, wherein the pulley wheel body defines an annular groove in the first outer wheel portion;

the base ring comprises a coupling feature that is configured to be retained within the annular groove; and the coupling feature of the bristle ring is retained in the annular groove.

8. The snatch ring pulley assembly of claim 1, wherein a surface defining the center aperture is coated with a material having a low coefficient of friction.

9. A snatch ring pulley assembly comprising:

a pulley wheel body including:

a first outer wheel portion including a plurality of through holes defined therein, a second outer wheel portion parallel to the first outer wheel portion and including a plurality of through holes defined therein, and a rope saddle portion defined between the first outer wheel portion and the second outer wheel portion; and a first plurality of resilient fingers seated within the plurality of through holes in the first outer wheel portion and a second plurality of resilient fingers seated within the plurality of through holes in the second outer wheel portion, wherein the first plurality of resilient fingers extend from the first outer wheel portion toward the second outer wheel portion, and wherein the second plurality of resilient fingers extend from the second outer wheel portion toward the first outer wheel portion, wherein the rope saddle portion does not include any resilient fingers.

10. The snatch ring pulley assembly of claim 9, wherein the rope saddle portion of the pulley wheel body defines a plurality of rope traction features.

11. The snatch ring pulley assembly of claim 9, wherein the pulley wheel body defines a center aperture bounded by a surface and the surface is coated with a material having a low coefficient of friction.

* * * * *